US007003117B2

(12) United States Patent
Kacker et al.

(10) Patent No.: US 7,003,117 B2
(45) Date of Patent: Feb. 21, 2006

(54) IDENTITY-BASED ENCRYPTION SYSTEM FOR SECURE DATA DISTRIBUTION

(75) Inventors: Rishi R. Kacker, Menlo Park, CA (US); Guido Appenzeller, Menlo Park, CA (US); Matthew J. Pauker, Menlo Park, CA (US); Terence Spies, Palo Alto, CA (US)

(73) Assignee: Voltage Security, Inc., Palo Alto, CA (US)

( * ) Notice: Subject to any disclaimer, the term of this patent is extended or adjusted under 35 U.S.C. 154(b) by 0 days.

(21) Appl. No.: 10/361,192

(22) Filed: Feb. 5, 2003

(65) Prior Publication Data

US 2004/0151308 A1 Aug. 5, 2004

(51) Int. Cl.
*H04L 9/00* (2006.01)

(52) U.S. Cl. .................. 380/277; 380/278; 380/282; 726/1

(58) Field of Classification Search ............ 713/164, 713/166, 167; 705/1, 51, 50, 59, 71; 707/9, 707/10; 380/30, 282, 278; 726/1
See application file for complete search history.

(56) References Cited

U.S. PATENT DOCUMENTS

| 5,016,276 | A | 5/1991 | Matumoto et al. |
| 5,159,632 | A | 10/1992 | Crandall |
| 5,271,061 | A | 12/1993 | Crandall |
| 5,272,755 | A | 12/1993 | Miyaji et al. |
| 5,581,616 | A | 12/1996 | Crandall |
| 5,715,403 | A | 2/1998 | Stefik et al. |
| 6,061,448 | A | 5/2000 | Smith et al. |
| 6,236,971 | B1 | 5/2001 | Stefik et al. |
| 6,385,596 | B1 * | 5/2002 | Wiser et al. .......... 705/51 |
| 6,658,415 | B1 * | 12/2003 | Brown et al. ........ 707/10 |
| 6,886,096 | B1 * | 4/2005 | Appenzeller et al. ....... 713/170 |
| 2001/0016836 | A1 * | 8/2001 | Boccon-Gibod et al. ...... 705/51 |
| 2002/0076042 | A1 | 6/2002 | Sandhu et al. |
| 2003/0081785 | A1 * | 5/2003 | Boneh et al. ........... 380/277 |
| 2003/0179885 | A1 * | 9/2003 | Gentry et al. .......... 380/277 |
| 2003/0182573 | A1 * | 9/2003 | Toneguzzo et al. ..... 713/201 |
| 2004/0098589 | A1 * | 5/2004 | Appenzeller et al. ....... 713/170 |
| 2004/0151308 | A1 * | 8/2004 | Kacker et al. ............ 380/30 |
| 2004/0179684 | A1 * | 9/2004 | Appenzeller et al. ...... 380/44 |

(Continued)

OTHER PUBLICATIONS

Chandramouli, "Application of XML Tools for Enterprise-Wide RBAC Implementation Tasks", 5th ACM Workshop on Role-based Access Control, Jul. 26-27, 2000.*

(Continued)

*Primary Examiner*—Hosuk Song
*Assistant Examiner*—Beemnet W. Dada
(74) *Attorney, Agent, or Firm*—G. Victor Treyz (57) ABSTRACT

A system is provided that allows encrypted content to be distributed to users over a communications network. A policy enforcement service may use an identity-based encryption algorithm to generate public parameter information and private keys. Data content may be encrypted prior to distribution using an identity-based encryption engine. The encryption engine may use the public parameter information from the policy service and public key information to encrypt the data. The public key information may be based on policy information that specifies which types of users are allowed to access the data that is encrypted using that public key. A user may obtain a private key for unlocking particular encrypted data by providing a key request to the policy enforcement service that contains the public key. The policy enforcement service may enforce the policies given by the policy information and may provide private keys only to authorized users.

15 Claims, 7 Drawing Sheets

U.S. PATENT DOCUMENTS

| | | | |
|---|---|---|---|
| 2005/0010801 A1* | 1/2005 | Spies et al. | 713/200 |
| 2005/0084100 A1* | 4/2005 | Spies et al. | 380/30 |
| 2005/0138353 A1* | 6/2005 | Spies et al. | 713/153 |

OTHER PUBLICATIONS

Constantin Popescu, An efficient id-based group signature scheme, Studia univ, babes bolyai, informatica, vol. XLVII, Nov. 2, 2002.*

Christoph G. Gunther, An identyty-based key-exchange protocol, Springer-verlag, 1998.□□.*

Horwitz et al. Toward hiererchical identity-based encryption. 2002.□□.*

Ben Lynn, Authenticatd Identity-based encryption, Jun. 3, 2002.*

Atkins et al., "PGP Message Exchange Formats," Informational Request for Comments (Aug. 1996).

Boneh et al., "Identity-Based Encryption from the Well Pairing," from *Crytpo '2001* (Oct. 2002).

Cocks, Clifford, "An Identity Based Encryption Scheme based on Quadratic Residues." (2001).

Horwitz et al., "Toward Hiererchical Identity-Based Ebcryption," *Proceedings of EUROCRYPT 2002*, (Apr. 28, 2002-May 2, 2002) Lecture-Notes in Computer Science, Standford University.

Housley et al., "Internet X.509 Public Key Infrastructure Certificate and CRL Profile," Standards Track Request for Comments (Jan. 1999).

Lai et al., "A Proposal for a New Block Encryption Standard," *Advances in Cryptology: EUROCRYPT 1990 Proceedings*, Springer Verlag: pp. 389-404 (1991).

Mont et al., "The HP Time Vault Service: Innovating the way confidential informnation is disclosed, at the right time" http://www.hpl.hp.com/techreports/2002/HPL-2002-243.html (2002).

Rivest et al., "A Method for Obtaining Digital Signatures and Public-Key Cryptosystems," from The Communications of the ACM (Feb. 1978).

* cited by examiner

DATA STRUCTURE

```
<INVENTORY_RECORD>
    <PART_NO   NO = 1735261/>
    <QUANTITY  Q = 356>
    <SUPPLIER  "COMP = DELCO"/>
    <REGION    R = "US"/>
        ⋮
</INVENTORY_RECORD>
```

FIG. 7a

```
<IBE_ACCESS_POLICY_INFORMATION_RECORD>
    <TYPE T = "INVENTORY_RECORD"/>
    <FIELD F = "SUPPLIER" POLICY = "MUST_BE_CUSTOMER_OF"/>
    <FIELD F = "REGION" POLICY = "MUST_BE_IN"/>
</IBE_ACCESS_POLICY_INFORMATION_RECORD>
```

FIG. 7b

PUBLIC_KEY = "MUST_BE_CUSTOMER_OF = DELCO,
MUST_BE_IN_REGION = U.S."

FIG. 7c

IDENTITY-BASED ENCRYPTION SYSTEM FOR SECURE DATA DISTRIBUTION

BACKGROUND OF THE INVENTION

This invention relates to encryption, and more particularly, to identity-based encryption schemes for securely distributing data.

It has become common to store content such as songs and video in digital form. Cryptographic techniques may be used to help secure such content from unauthorized use.

A number of cryptographic techniques are available for use in encrypting data. For example, symmetric key techniques have been extensively used. With symmetric key arrangements, a first party encrypts data for a second party using a symmetric key. The second party decrypts the encrypted data using the same symmetric key. Symmetric-key systems require that the symmetric key be exchanged between the parties involved in a secure manner.

With public-key cryptographic systems such as the RSA cryptographic system, two types of keys are used—public keys and private keys. Data for a given party may be encrypted using the unique public key of that party. Each party has a corresponding private key that is used to decrypt the encrypted data.

Identity-based encryption schemes have also been proposed. Such identity-based encryption schemes may use public parameters to encrypt data. These schemes are said to be "identity based," because user-specific identity information such as a particular user's email address is used as one of the inputs to the encryption algorithm. Each user has a unique private key based on the user's identity for decrypting encrypted data. With this type of scheme, a single set of public parameters (used during the encryption and decryption processes) may be shared by many users.

SUMMARY OF THE INVENTION

In accordance with the present invention, a system is provided for distributing content securely using an identity-based encryption scheme. In the identity-based encryption algorithm used with this scheme, a public key based on policy information is used as an input, rather than actual identity information that is specific to a single user. The system may be used to distribute content such as digitally-encoded movies or other videos, digitally-encoded songs (e.g., MP3 files) or other suitable audio files, text (e.g., books or magazines), graphics (e.g., digital images), stock sale or banking records, software (e.g., games and other applications), corporate inventory or supply chain data, or any other suitable content.

A content provider (e.g., a movie studio, record label, or television network in the case of media-related content, a brokerage house or bank or other financial institution in the case of financial record content, a corporation producing supply chain data, a software distributor or developer in the case of games and other applications, or any other suitable institution or party) may generate data (content) to be distributed. A data packaging service may be used to encrypt the data.

The data that is to be encrypted may have associated attributes such as rating, date, title, owner name, price, etc. Attributes may have an attribute name (e.g., "rating") and an associated attribute value (e.g., "R"). The data attributes may be separate from the data (e.g., as with the rating for a movie) or may be part of the data itself (e.g., in the case of an XML data structure made up of XML fields that serve as both data and attributes). If desired, the data packaging service can place the attributes into the data structure with the data to be encrypted. A data structure type (e.g., "movie") may be associated with the data structure.

Some or all of the attributes associated with the data to be encrypted may be used as policy information to regulate access to the data once it has been encrypted. In general, the particular attributes that are associated with any given data depend on the type of data involved.

The data packaging service may use an identity-based encryption engine (encryption process) to encrypt the data (e.g., when encrypting the content of a data structure). The identity-based encryption engine takes the data to be encrypted and produces corresponding encrypted data. At least two inputs are used by the engine in encrypting the data. The first input is public parameter information, for example, public parameter information in the form of a set of identity-based-encryption public parameters P and sP as described below in connection with the work of Boneh and Franklin. The second input takes the place of the "identity" used in proposed identity-based encryption algorithms. This second input is referred to herein as a "public key," rather than an "identity," because it may be associated with a plurality of users, rather than a single user as would be the case if a unique user-specific identity such as a user's email address were to be used. Despite this distinction between identity-based encryption schemes based on the unique identity of each user and the present approach, the present approach is still referred to herein as an "identity-based" encryption scheme to clearly distinguish it from traditional public-key encryption approaches such as the RSA public key approach. The identity-based encryption engine may encrypt the data using the public parameters and the public key without communicating with other system databases or components.

The public key in the present identity-based encryption scheme is not associated with any particular user, but rather is based on generic policy information that regulates the access rights of multiple users (e.g., hundreds, thousands, or millions of users). The policy information of the public key may, for example, be formed using the attributes of the data. One illustrative way in which to assemble the public key from the attributes involves the concatenation of attribute names and values. For example, for digital video, the public key might be "secure-video://Name=Matrix; Distributor=Paramount;Date=Aug-2002;Rating="R." If desired, the data may be packaged in an XML data structure. Using an XML-based format to handle data and attribute information may be advantageous in situations in which XML-based attribute standards obtain acceptance in the industry.

Data to be encrypted may be packaged in data structures of different types. For example, one data structure type may be "movie" and another may be "song." The way in which the attributes for particular data to be encrypted are used to form the public keys (e.g., which particular attributes are to be used and their order in any concatenation process that is to be used) may be specified using data type encryption policy information. If the attributes are maintained in an XML record, the data type encryption policy information may be used to specify which of the XML record entries are used to form the public key and how these entries are to be used (e.g., the order in which certain entries should be concatenated, etc.). If desired, the data type encryption policy information itself may be stored using an XML format. Moreover, the public keys may be created using XML (e.g., the public keys may be in XML format).

The content in the encrypted data may not be accessed without first decrypting the data. This may be accomplished only through use of an appropriate private key that corresponds to the public key used to encrypt the data. A user who has obtained given encrypted data (e.g., directly from the data packaging service or associated distribution services or from another user in a peer-to-peer transaction) may be granted access to the content in the encrypted data (e.g., by being provided with an appropriate private key) through a policy enforcement service.

The policy enforcement service may use various types of policy information in determining whether or not to grant access to a given user. For example, global policy information may dictate that no videos of rating R may be released to users who are less than 17 years of age. Policy information may also be used to implement commercial subscription rules (e.g., if a user is on the "Spielberg Special Plan," a private key may be issued for all movies whose director is Steven Spielberg). The policy information that is used by the policy enforcement service is typically provided to the policy enforcement service by the user in the form of an access request containing the public key (and its included policy information), but global policy information (e.g., information already known to the policy enforcement service) need not be retransmitted and may be used to supplement or override the policy information provided in the access request. Global policy information used by the policy enforcement server in regulating user access to data may be based on prearranged industry standards or government regulations, etc. Such policy information need not be provided to the policy enforcement service by the user, because it is already in the possession of the policy enforcement service.

The policy enforcement service may be used to administer subscription services (e.g., to process purchase transactions using credit cards, etc.). A user desiring to obtain a private key to decrypt particular encrypted data may provide suitable authentication information (e.g., information on the characteristics of the user such as information identifying the user, user age information, user account information, user security clearance, user membership status, user gender, user credit card status, or other suitable user-dependent characteristics). The policy enforcement service may use this information on the characteristics of the user in enforcing the policy rules set forth by the policy information to determine whether the user is authorized to access the content of the encrypted data. If the user is authorized, the user may be provided with the necessary private key (e.g., over a secure communications path such as a secure sockets layer (SSL) path).

Once the user has obtained the private key, the user may use an identity-based decryption engine to decrypt the encrypted data and thereby access and use the data in its unencrypted form. The identity-based decryption engine may be provided as stand-alone software implemented on the user's equipment or may be built into or work in conjunction with other user software. For example, a media player suitable for playing back videos and audio files may be implemented on the user's equipment. The identity-based decryption engine functions may be incorporated into the media player or may be automatically invoked by the media player when the user desires to play back or view certain content.

An advantage of the present identity-based-encryption content distribution approach is that content can be distributed in a secure fashion, without needing to manage public-private key pairs for each content recipient. With the present approach, a single public key may be used to specify a policy that governs a large number of users. Private keys are generated for each public key, but public keys need only be generated when different policies are implemented (e.g., when a movie of a different rating or subscription plan is to be distributed). It is not necessary to generate a public key or to perform a unique identity-based encryption process for each individual user.

The private keys that are released to users may, in general, be used to decrypt a number of different encrypted data items(i.e., one private key may be used to decrypt all the encrypted data items that have been encrypted using the same public key policy information). However, because private keys are released on a policy-appropriate basis, users need only be given private keys that are appropriate for their level of authorization, which helps to maintain the integrity of the system. For example, a user who obtains a private key to unlock a movie that has been encrypted with a public key that includes a G rating, will not be able to use that private key to unlock R-rated movies (because the private key would not match the R-rating based public key used to encrypt such R-rated movies). Any movies that can be decrypted by the user (in this example) will be at the G rating level. As another example, if a user receives a private key that allows the user to decrypt a rated-R movie, the private key might be used to decrypt another rated R movie. However, because the user has already been verified as having an appropriate age (e.g., over 17 years) to access the first R-rated content, the user is not provided with rights that are out of line with the user's level of access rights. At the same time, it is not necessary to encrypt each piece of data using a completely separate user-specific public key, which could make the system burdensome to administer.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
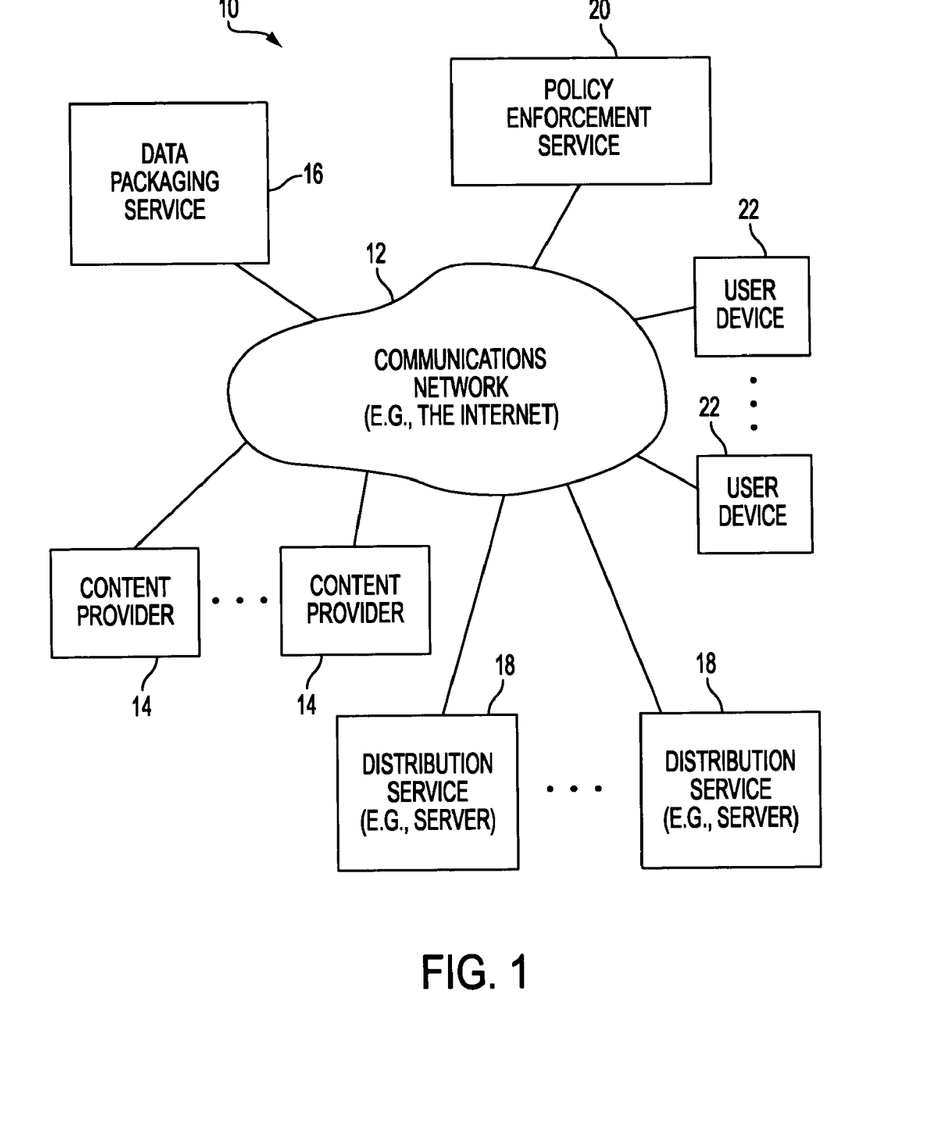
FIG. 1 is a diagram of an illustrative identity-based encryption system for distributing content to users in accordance with the present invention.

An illustrative identity-based cryptographic system 10 for distributing content to users in accordance with the present invention is shown in FIG. 1. System 10 allows users at various locations to receive secured data using an identity-based encryption and data distribution scheme. The users in the system may be individuals, organizations, or any other suitable parties or entities. Users may have associated user devices or equipment 22. Equipment 22 may, for example, include computing equipment such as a personal computers, portable computers, mainframe computers, networked computers or terminals, telecommunications equipment, handheld computers or personal digital assistants, or cellular telephones. Multiple users may use the same device. For example, a group of users may share the use of a single computer terminal that is connected to a host computer in a local area network. These are merely illustrative examples of the type of platforms that the users of system 10 may use. User equipment 22 may be based on any suitable electronic equipment if desired.

The user equipment devices may be interconnected by a communications network 12. Network 12 may be, for example, the Internet, a local area network, a wide area network, the public switched telephone network, a virtual private network, a wired network, a wireless network, dedicated leased lines, a network based on fiber-optic or cable paths or other wired or wireless paths, or a network formed using any other suitable network technology or a combination of such networks.

Various computing devices may be connected to network 12 to support the features of the identity-based encryption scheme. For example, computing equipment at one or more content providers 14 may be used to store and provide content. The content that is distributed using system 10 may be media (e.g., digital video or audio), business record data (e.g., stock sales data, banking or other financial records, supply chain data, etc.), software (e.g., games or other applications), or any other suitable data. Content providers 14 (which may also be called data providers) may be any suitable entities or enterprises associated with the content. For example, content providers 14 may be movie studios or record labels if the content being distributed involves media content such as movies or songs. Content providers 14 may be banks or other financial institutions when the content being distributed is a stock sales transaction or bank account record. Content providers 14 may be software distributors or developers when the data being distributed includes software.

Although illustrated as individual content providers 14 in FIG. 1, the functions of content providers 14 (generating, storing, maintaining, and providing content) may be distributed across one or more actual entities or organizations and one or more installations of suitable computer equipment. For clarity, the operations of such distributed entities and equipment will be discussed primarily in the context of one or more individual content providers, as shown in FIG. 1.

In some arrangements, the computing equipment of content providers 14 and the other entities of FIG. 1 may be used to provide the functions of a server in a client-server architecture. For clarity, the present invention will sometimes be described in the context of such server-based arrangements. This is, however, merely illustrative. Any suitable computing device arrangement may be used to distribute information in system 10 if desired. A typical server-based arrangement may use one or more computers to provide the functions of a server. A server may be formed using a single computer or multiple computers. If desired, the functions of a single server may be provided by computers that are distributed over a number of different physical locations.

Content providers 14 and the other entities of FIG. 1 may be based on a suitable computing platform such as a server-based platform that is connected to communications network 12.

Some activities in system 10, such as deciding when to initiate data distribution or user activities such as requesting access to encrypted data may involve (or even require) manual intervention.

Other activities (including user activities) in system 10 may be automated or semiautomated. These activities may take place with little or no manual intervention. As just one example, a data or content provider 14 may be associated with a music or video distribution service that desires to use encrypted communications to deliver encrypted movies or songs to account holding users at user devices 22 over communications network 12. The distribution process may be automated so that no operator intervention will generally be needed at the distribution service equipment once the system has been properly set up. User receipt of the encrypted content may also be automated.

Data from content providers 14 may be provided to a data packaging service such as data packaging service 16 (e.g., electronically over communications network 12). The data packaging service may encrypt the data before providing the data to users. If desired, data packaging service 16 may place the content to be encrypted into a data structure (e.g., if this function has not already been performed by the content provider 14). Data attributes may be associated with the data. For example, rating attributes may be associated with movie content, supplier identities may be associated with supply chain data, artists may be associated with song data, etc. Multiple data attributes may be associated with the same data item. For example, song data may have associated attributes such as date of release, artist, title, record label, genre, rating, etc.

The data packaging service may place the data into a data structure of any suitable data structure type. For example, video content for a movie that has been provided by a content provider 14 may be placed into a data structure of type "movie." The movie data may have, for example, associated attributes such as "rating=R," "Director=Spielberg," "Price=$10.00," etc.

The data packaging service 16 may be implemented using any suitable computing equipment (e.g., a personal computer, mainframe, distributed or networked collection of computers, servers, etc.). The data packaging and/or encryption and other functions of data packaging service 16 may be provided by an encryption service 16 or any other suitable service provider or entity 16. These services may be stand-alone services or may be integrated into other services and entities. Such encryption services are generally referred to herein as being "data packaging services" for clarity.

Service 16 (e.g., a data packaging service 16, encryption service 16, or other suitable stand-alone or integrated service) may have computing equipment that is used to implement an identity-based encryption engine. The identity-based encryption engine may have at least two inputs: a first input made up of public parameters received from policy enforcement service 20 and a second input (the so-called public key) that is made up of policy information. The public key input takes the place of the user identity information that is typically used in an identity-based encryption scheme.

Identity-based encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, Dec. 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231–229, August 2001. See also http://eprint.iacr.org/2001/090 by Dan Boneh and Matthew Franklin). For clarity, aspects of the present invention will sometimes be described in the context of an identity-based encryption scheme such as the elliptic curve implementation described by Boneh and Franklin. This is, however, merely illustrative. Any suitable approach for identity-based encryption may be used with system 10 if desired.

Regardless of the particular type of identity-based encryption scheme that is used, the encryption scheme generally will use at least two inputs in addition to the data being encrypted.

The first input is public parameter information (e.g., public parameters P and sP in the work of Boneh and Franklin, where s is the so-called "master secret" being used in the identity-based encryption algorithm). In system 10, the master secret is maintained by policy enforcement service 20. Service 20 may generate the public parameter information (e.g., parameters P and sP) using the master secret. The public parameter information may be provided to data packaging service 16 for use in encrypting the data structure (i.e., for use as a first input to the data encryption engine).

The second input used by the data encryption engine is the public key that contains policy information (e.g., the public key contains information on the rating of a movie or corresponding information in a different form that is nevertheless derived from the rating of the movie, which dictates what the required age is for a user to view the movie). When a traditional identity-based encryption scheme is used to support (for example) encrypted messaging between a message sender and a message receiver, the encryption engine makes use of the receiver's identity as an input to the identity-based encryption engine. In contrast, in the content distribution scheme of system 10, the public key based on the policy information (called Q) is used as the second input. This second input is not specific to any single user.

The first and second inputs to the encryption engine are used by the data packaging service to encrypt the data (e.g., the content of the data structure). The encrypted data may then be securely communicated to users at user devices 22 (e.g., over the Internet). The policy information used to encrypt the data (e.g., the required age of the user in the ratings example) may be provided to the user along with the data if desired (or information on what the appropriate associated policy information is may be communicated to the user—e.g., in a code). The user may also implicitly know or be expected to know that certain global policies are in effect (e.g., that no users under age 18 may access certain types of content, etc.)

The data that is encrypted may have multiple data attributes. For example, a movie to be encrypted may have an associated rating data attribute (e.g., R) and an associated studio data attribute (e.g., Sony). The policy information that is used as the public key when encrypting the data may be based on one or more such data attributes. An advantage of basing the policy information on multiple data attributes is that this approach allows the data packaging (encryption) service to secure data for distribution to more finely tailored types of users than would be possible using only a single data attribute (although a single data attribute may be used as the basis of the policy information if desired). For example, policy information may be formed using multiple data attributes of a movie such as rating=R and studio=Sony. During user authentication, the policy enforcement service may use this multiple-attribute policy information and information on the characteristics of a given user who is requesting access to the encrypted data (e.g., age=30 and studio membership status=Sony) to determine whether or not to provide the requesting user with the private key needed to decrypt the encrypted data.

The user may use the policy information received from the data packaging service (or information received from the data packaging service that identifies appropriate applicable policy information) to formulate an access request. The access request is used to obtain access permission to the encrypted content from the policy enforcement service. If the access request for access to a particular encrypted data item is granted, the policy enforcement service may provide the user with an appropriate private key to decrypt that encrypted data item.

If desired, the user may use policy information that has been received from the data packaging service as the basis for the access request. For example, the user may forward the policy information that has been received to the policy enforcement service. As another example, the user may generate an access request that does not include all of the policy information itself (or which may not even include any of the policy information), but which includes sufficient information to inform the policy enforcement service which public key (and corresponding policy) and which private key correspond to the access request. The access request (or a follow-up communication between the user and the policy enforcement service) may include information on the characteristics of the user (e.g., user age, membership status, security clearance, etc.)

Regardless of the particular form and content of the access request, the access request preferably contains sufficient information to identify the private key that is being requested. As a result, the access request directs the policy enforcement service to provide a private key corresponding to the public key that was used to encrypt the data. The policy enforcement service 20 uses the access request to determine which access policy applies to the user and uses this policy in combination with information on the characteristics of the user that is provided to the policy enforcement service (e.g., age information, credit card status, driver's license number, membership status, etc.) to ascertain whether the user is authorized to access the encrypted data.

If the policy enforcement service determines that the user (e.g., the information on the characteristics of the user) satisfies the policy constraints imposed by the policy and that the user is therefore authorized to access the contents of the encrypted data, the policy enforcement service may provide the user with the private key (e.g., sQ for systems of the type described in the work of Boneh and Franklin) that corresponds to the public key (Q) that was used to encrypt the data. The user may use the private key (e.g., sQ) and an identity-based decryption engine implemented on the user's equipment 22 to decrypt the encrypted data and thereby access the desired content. Some policy information (e.g., global policy information based on legally-mandated policies) may be so well known by the industry, that it is not necessary for the user or other entities to forward this information to policy enforcement service 20. Rather, such policy information may be pre-stored at policy enforcement service 20. The global policy information may be used to supplement or override the policy information represented by the public key.

Distribution servers 18 may be used to facilitate the data distribution process. For example, distribution services in various countries or locations within a country may serve as downloading services or intermediate transfer equipment. When providing encrypted content to the users. The encrypted data may be downloaded from the distribution services on request by the users or may be pushed to the user (e.g., using a broadcast arrangement). Encrypted content may also be distributed using a hardcopy approach (e.g., by supplying encrypted content on a DVD or CD disk or other storage media, etc.). These are merely illustrative examples. Any suitable technique may be used to distribute encrypted data that has been encrypted by the data packaging service to the users if desired. Moreover, the policy information can be provided to the user with the encrypted data or may be provided in a separate communication. Global policy information (e.g., information such as the permitted age of access for videos with various ratings) may be provided at any time and need not necessarily be retransmitted to the user or provided by the user to the policy enforcement service 20.

In system 10, the second input to the identity-based encryption engine (Q) is referred to as a public key, rather than an identity, because this second input is not specific to an individual user and may be used to encrypt data that is distributed to many users.

The public key Q may be formed from the attributes associated with the data. For example, one of the data attributes (e.g., rating=R) may be used as the public key. As another example, multiple data attributes may be concatenated together to form Q. As an example, the public key Q for a movie might be "secure-video://Name=Matrix; distributor=Paramount;Date=Aug-2002;Rating="R."

Figure 6:
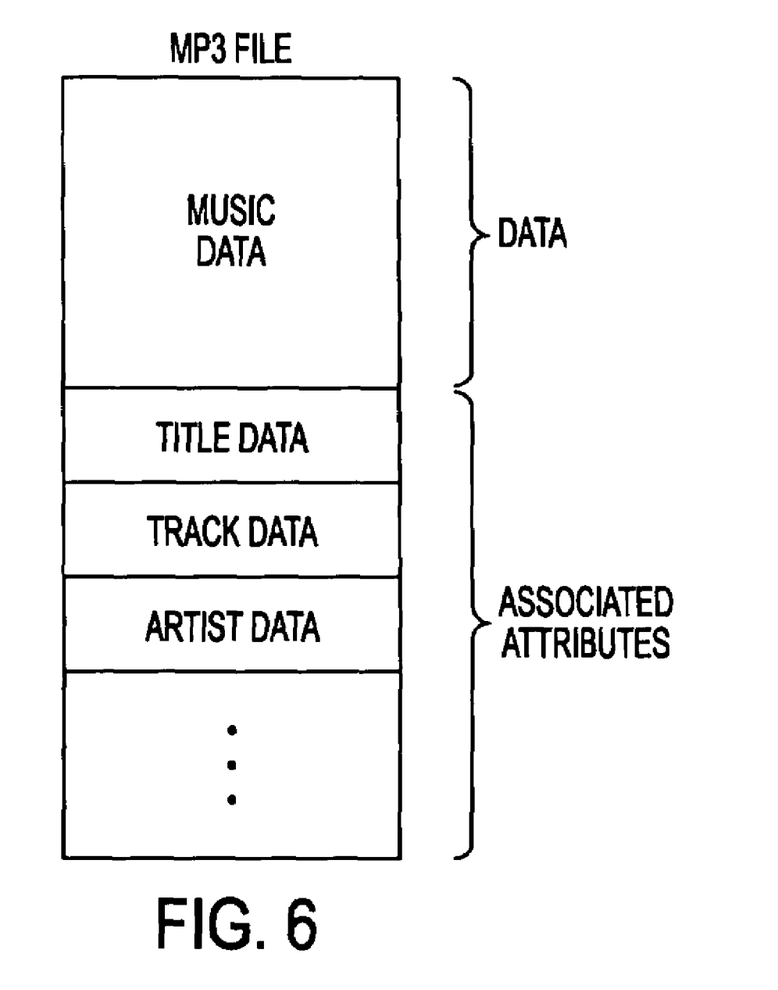
FIG. 6 is a diagram of an illustrative MP3 file showing how music data content and associated data attributes may be packaged into a single data structure in accordance with the present invention.

The data and data attributes may be packaged together in a data structure. For example, as shown in FIG. 6, an MP3 file data structure may contain both data (e.g., music data) and associated attributes (e.g., title information, artist information, track information, etc.)

If desired, the data may be an XML data structure containing the content (e.g., the video file) and the attributes of the content (e.g., rating, director, date, price, etc.). Using an XML-based format to handle attribute information may be advantageous in situations in which XML-based attribute standards obtain acceptance in the industry.

If desired, the way in which the attributes for particular data are used to form the public key Q for that data may be specified using data type encryption policy information. If the attributes are maintained in an XML record, the data type encryption policy information may be used to specify which of the XML record entries are used to form the public key and how these entries are to be used (e.g., the order in which certain entries should be concatenated, etc.). If desired, the data type encryption policy information itself may be stored using an XML format.

Figure 7A:
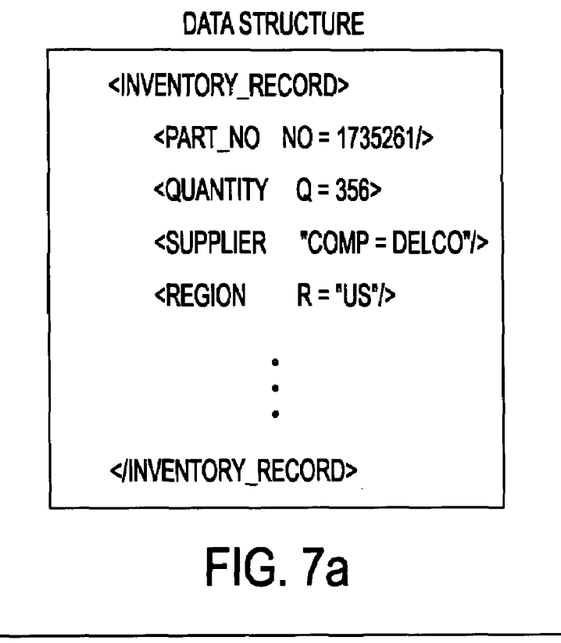
FIG. 7a is a diagram of an illustrative data structure (in XML format) in accordance with the present invention.
Figure 7B:
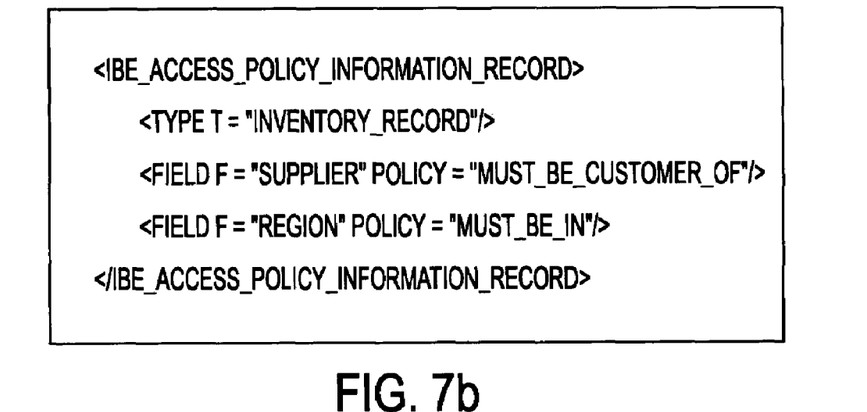
FIG. 7b is a diagram of illustrative data type encryption policy information (in XML format) that may be used to determine how to use the data attributes of the data shown in FIG. 7a in forming a public key for use in encrypting the data of the data structure in accordance with the present invention.
Figure 7C:
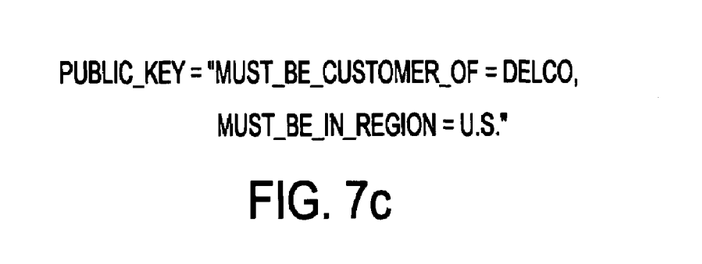
FIG. 7c is a diagram of the public key (which may be provided in XML format) that may be created from the data structure attributes of FIG. 7a based on the data type encryption policy information of FIG. 7b in accordance with the present invention.

An example of this type of arrangement is shown in FIGS. 7a, 7b, and 7c. As shown in FIG. 7a, an XML format data structure may include supply chain data such as part number data, quantity data, region data, supplier data, etc. Supply chain data is merely illustrative. Any suitable type of data may be provided in an XML data structure of the type shown in FIG. 7a if desired.

Illustrative data type encryption policy information that is provided in XML format is shown in FIG. 7b. In the example of FIG. 7b, the data type encryption policy information contains XML fields that specify how the data structure fields of the XML data structure of FIG. 7a are to be used to form the policy information. For example, the supplier field of FIG. 7b specifies how the policy requirement "must-be-a-customer-of" is to be applied to the supplier field "company=Delco" of the data structure of FIG. 7a. Moreover, the region field of FIG. 7b specifies how the policy requirement "must-be-in-region" is to be applied to the region field "region=US" of FIG. 7a.

The policy information that results when using the XML data type encryption policy information to specify how to use the XML data structure attributes of FIG. 7a is shown in FIG. 7c. The policy information that is used for the public key may, if desired, be provided using XML (e.g., the public key may be an XML-format public key).

The identity-based encryption process used in system 10 may involve a two-step process, in which one of the two steps uses identity-based encryption and the other of the two steps uses a non-identity-based approach such as a symmetric key approach. For example, the content of the data (e.g., the content of a data structure) need not be directly encrypted using identity-based encryption, but rather may be encrypted using a symmetric key, which in turn is encrypted using identity based encryption and stored in association with the data (e.g., as part of the encrypted data structure that includes the encrypted data). A recipient of the encrypted symmetric key can decrypt the symmetric key and use it to decrypt the content.

In this situation, the bulk of the data payload (e.g., the data structure video or other content) is encrypted using a symmetric key that has itself been encrypted using identity-based encryption, rather than being encrypted directly using identity-based encryption. This generally provides a speed advantage over encrypting all of the data directly using identity-based encryption without using the embedded-symmetric-key approach, because symmetric key encryption/decryption is highly efficient. Because either of these approaches (direct or indirect identity-based encryption) may be used in system 10 in substantially the same way, both data encryption approaches (single-step and two-step) will be referred to herein as "identity-based encryption" for clarity.

In the arrangement of FIG. 1, the data distribution services 18 (based, e.g., on servers) that may be used to assist in the distribution of the encrypted data to users are shown as being separate from data packaging service 16 and content providers 14, but if desired, content providers 14, data packaging service 16, and one or more of the distribution services 18 may be co-located or their functionality provided using any other suitable number of computing equipment installations or services.

The distribution services may, if desired, allow a user to browse a content list and select desired content items for downloading. Content may also be distributed automatically using servers 18, according to a schedule, or using any other suitable approach.

Steps involved in using an identity-based cryptographic scheme and the equipment of FIG. 1 to distribute content to user devices 22 are shown in FIGS. 2, 3, 4, and 5. The content that is being distributed may be any digital information (e.g., text, graphics, audio, video, commands, executable code, data, etc.) that is to be conveyed in a secure manner.

Figure 2:
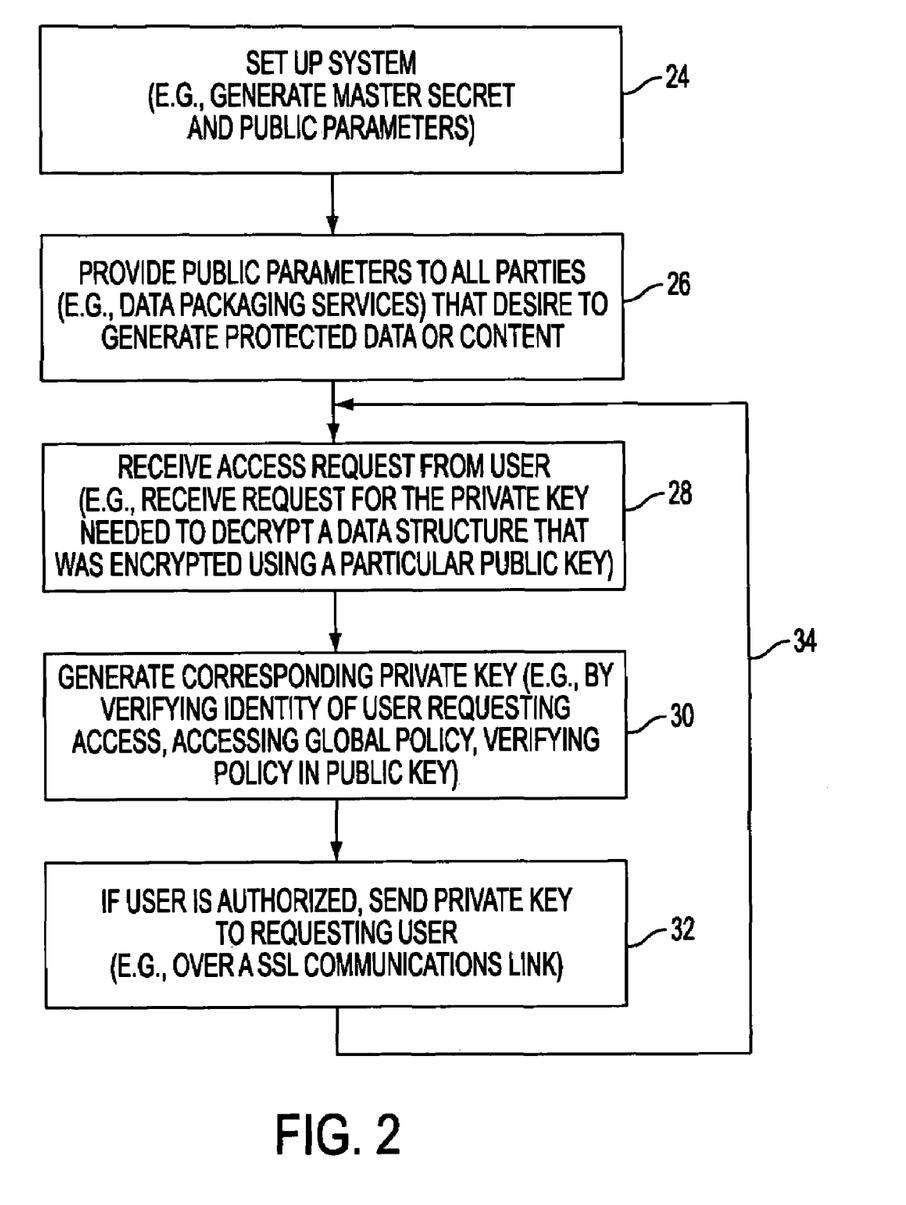
FIG. 2 is a flow chart of illustrative steps involved in using the policy enforcement service to support encrypted content distribution using the system of FIG. 1 in accordance with the present invention.

The steps of FIG. 2 relate to setting up and using policy enforcement service 20 in system 10. At step 24 of FIG. 2, policy enforcement service 20 of FIG. 1 obtains a master secret s. For example, the policy enforcement service 20 may create a master secret from a number that is randomly generated at the service by a processor housed inside a tamper-proof enclosure. The master secret may also be produced off-site and delivered to the policy enforcement service 20. The master secret (also sometimes referred to as a secret master key or a master key) is secret information that will subsequently be used by the policy enforcement service 20 to generate private keys (e.g., private keys sQ in systems of the type described in the work of Boneh and Franklin) for users 22 in the system to use in decrypting encrypted data and to generate public parameter information (e.g., P and sP) for use by data packaging service 16 in encrypting data (e.g., the data of data structures) prior to distribution.

During step 24, the policy enforcement service 20 may generate the public parameter information. For example, the policy enforcement service 20 may obtain or generate a public parameter P. Depending on the specific type of identity-based encryption being used, other public parameter information may also be generated. For example, when an identity-based encryption scheme of the type described in the work of Boneh and Franklin is involved, the values of the master secret s and public parameter P may be used by the policy enforcement service 20 to generate an additional corresponding public parameter sP. Thus, in systems based on the Boneh and Franklin scheme, the public parameter information may include both P and sP.

The parameters P and sP in systems of the type described in the Boneh and Franklin work may be numbers. In general, there is an equivalency between numbers, letters, symbols, and other such schemes for representing information. Sometimes certain information (e.g., the master secret or public parameters) will be described as being in number form and sometimes certain information (e.g., data attributes that may be used as policy information) may be described as being at least partly in character form (e.g., in the form of a rating, etc.). Because of the inherent equivalency between these different representational schemes, the techniques involved in converting letters or symbols into numbers or for representing multiple numbers or strings as a single number or other such operations are not described in detail herein.

At step 24, the policy enforcement service 20 may make the public parameter information (e.g., parameters P and sP) available to data packaging services such as data packaging service 16 or any other service or entity that is to encrypt content. For example, the public parameter information may be made available over the communications network 12 using computing equipment (e.g., a server) at policy enforcement service 20. The public parameter information may be provided to the data packaging service via courier (e.g., on a diskette or other storage media), etc. The public parameter information (e.g., parameters P and sP) may be provided to services such as data packaging service 16 as part of a downloadable or preinstalled software module or package. For example, public parameter information (e.g., public parameters P and sP) may be incorporated into or provided with the identity-based encryption engine software package used by the data packaging service.

Public parameters such as parameters P and sP may be made available to the data packaging service 16 together or separately. If parameters such as parameters P and sP are distributed separately, each parameter may be distributed using a different distribution mechanism. For example, P may be built into the data packaging service's software and sP may be distributed over the Internet. Moreover, P and sP may be combined to form the equivalent of a single number or parameter (still referred to herein using the plural form "parameters" for clarity and convenience) or may be subdivided (e.g., to form three or more public parameter subparts). If desired public parameters P and sP may be provided to data packaging service 16 from policy enforcement service 20 by printed mail. These are merely illustrative examples. Any suitable technique may be used to make the public parameter information such as public parameters P and sP available to data packaging service 16 at step 26 if desired.

Once the public parameter information (e.g., parameters P and sP) has been provided to the data packaging service 16, the data packaging service may encrypt data (e.g., data structures containing content that the data packaging service obtains from content providers 14). The encrypted data may be distributed to users 22 (e.g., via data distribution services 18 and communications network 12). Policy information that governs the access rules for accessing the contents of the encrypted data may be used to form a public key that is used as in input when encrypting the data and that may later be used in deciding who can access the content (i.e., the unencrypted version of the encrypted data). Some policy information used in system 10 may be globally known (e.g., rated-R movies require users to be 17 years of age or older). Other policy information may not be globally known (e.g., the price for this movie is $10.00 or rated G movies can be viewed by people of all ages). The policy information (e.g., the policy information that is in the public key and that is not globally known) may be conveyed to the users 22 and policy enforcement service 20 over communications network 12.

A user who desires to access a particular encrypted data item may generate an access request for the policy enforcement service. The access request directs the policy enforcement service to provide the user with a private key (if the user is authorized) that corresponds to the public key that was used to encrypt that data item. The access request may include the public key and the policy information represented by that public key (or may include information identifying the relevant public key to the policy enforcement service) and this may be provided to the policy enforcement service 20 over communications network 12.

At step 28, the policy enforcement service may receive an access request from a user who desires to access the content of a particular piece of encrypted data that the user has received from the data packaging service 16. The access request is in effect a request from the user for a copy of the private key that corresponds to the public key that the user is providing or identifying through the access request and that was used by the data packaging service's identity-based encryption engine to encrypt the data structure.

At step 30, the policy enforcement service 20 may generate the private key (sQ) using the policy enforcement service's knowledge of the master secret s and the public key (policy information) Q and using the identity-based encryption algorithm. During step 30, the policy enforcement service may use the policy information of the public key to determine whether or not the requesting user is entitled to receive the private key. For example, if the public key (policy information) is a rating (e.g., rating=R), the policy enforcement service 20 may attempt to ascertain whether or not the user is authorized to view R-rated content before providing the private key to the user. The policy enforcement server may, for example, ascertain the user's age and compare the user's age to the age associated with R-rated content (the age information may be part of the policy information in the public key or may be related global policy information that is already known by the policy enforcement service). Global policy information that is maintained at the policy enforcement service may be used by the policy enforcement service to supplement or override the policy information set forth in the public key (e.g., additional constraints may be added). A look-up table or other suitable database arrangement may be used by the policy enforcement service to allow the policy enforcement service to identify an appropriate public key and corresponding policy (and to thereby identify the appropriate private key being requested) when an access request does not explicitly include all of the necessary policy information, but rather provides sufficient information for the policy enforcement service to identify the relevant policy.

During the verification process of step 30, the policy enforcement service 20 may need to ascertain certain information about the user (e.g., age, subscription plan, location, etc.). The user information may be represented by any suitable strings, numbers, symbols, etc. Private keys may be made to automatically expire in system 10 by automatically concatenating the current time (e.g., the current day of the year and year, the current month, or any other suitable time-related date-stamp information) with the public key used during encryption at data packaging service 16. For clarity, the public key is generally described herein by the value Q. A suitable mathematical function may be used to determine the value of Q suitable for use as an input to the identity-based encryption private key generation algorithm used at policy enforcement service 20 from a string representation of the public key (policy information) or any other suitable representation.

Any suitable manual or automatic authentication technique may be used by the policy enforcement service 20 when verifying the user's access permission at step 30. For example, the user may be asked to fax or mail a letter containing user information to the private key generator 16 on the user's official letterhead, which is examined for authenticity by personnel or automated equipment at the private key generator. As another example, biometric identification techniques (e.g., fingerprint analysis, eye-scanning, handprint or voiceprint analysis, facial recognition methods, or in-person identification checks) may be used. When the authentication process involves electronic communications between the user and the policy enforcement service 20, the communications path between the user and the policy enforcement service 20 should be secure. The communications path may be assumed to be secure if it is not available for use by untrusted parties. For example, the network between the policy enforcement service 20 and the user 22 may be a private line that is controlled by the policy enforcement service 20 or another trusted authority. As another example, a secure channel may be supported using a secure web browser link (e.g., using the secure sockets layer protocol). After appropriate information has been gathered about the user and after the policy enforcement service 20 has applied the appropriate policy rules (from the public key policy information associated with the encrypted data) to verify the user's authorization to receive the private key at step 30, the private key may be provided to the user at step 32 (e.g., using a secure path such as a secure sockets layer (SSL) link over network 12). This is merely an illustrative technique for providing the private key to the user. Any suitable technique may be used if desired.

After the policy enforcement service 20 provides the private key to the receiver at step 26, processing may continue at step 28 (as indicated by line 34), so that the policy enforcement service 20 may receive additional requests for private keys from other users based on the public keys they provide.

Figure 3:
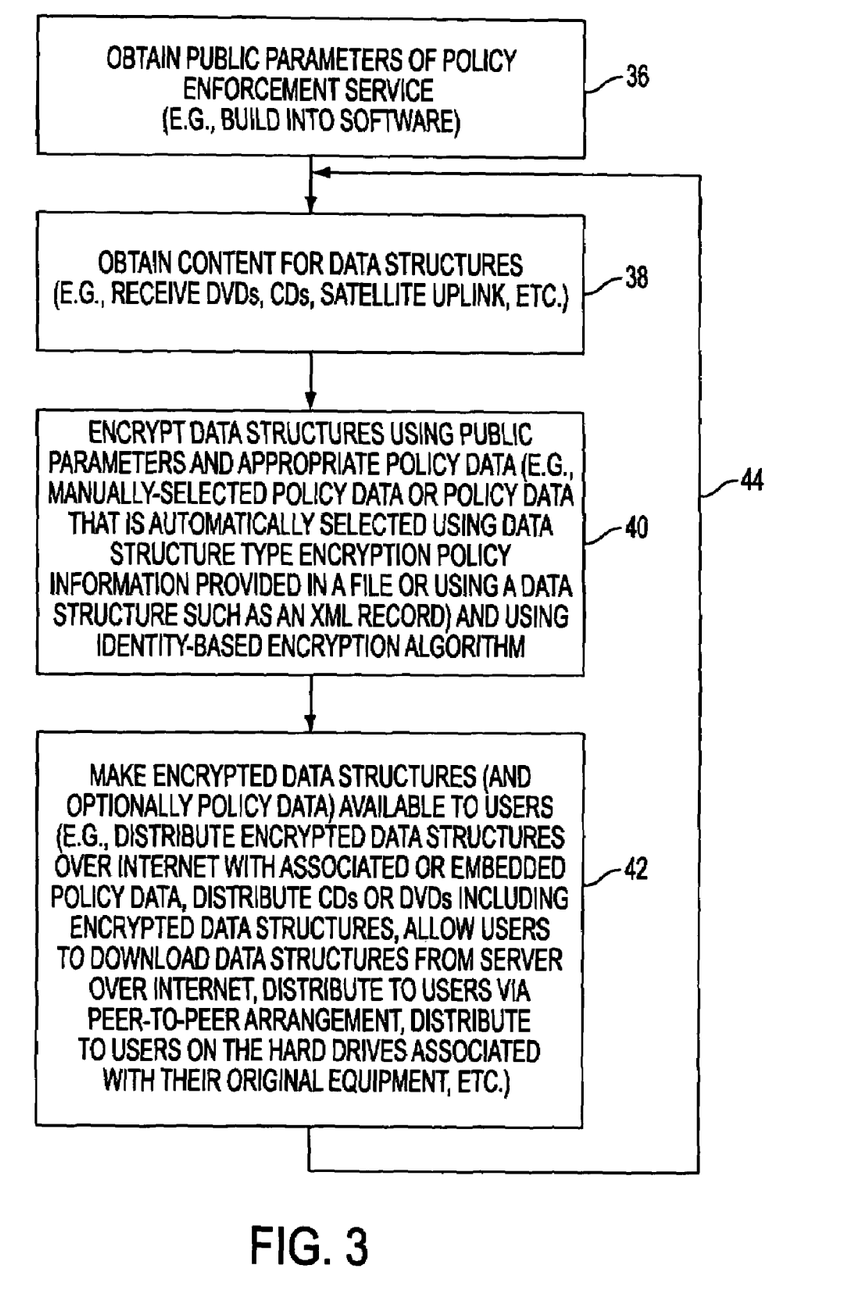
FIG. 3 is a flow chart of illustrative steps involved in using a packaging service and distribution services to encrypt and distribute data structures in accordance with the present invention.

Steps involved in using the data packaging service 16 in system 10 are shown in FIG. 3. At step 36, the data packaging service 16 may obtain the identity-based encryption public parameter information (e.g., public parameters P and sP). This information may be supplied by policy enforcement service 20. The public parameter information may be supplied using any suitable technique. For example, service 16 may be provided with the public parameter information electronically over network 12 or the public parameter information may be provided as part of the identity-based encryption engine software.

At step 38, the data packaging service 16 may obtain the data that is to be encrypted. Any suitable content may be distributed using system 10, such as media, software, text, graphics, financial records or other data. As an example, a digital version of a movie may be provided to data packaging service 16 using a satellite uplink (part of network 12) or by providing a CD or DVD containing the movie file to the service 16.

At step 40, the data packaging service 16 may, if desired, form a data structure of a particular type (e.g., the type "movie"). The content of the movie may be placed in the data structure. Attributes may be associated with the data. Such attributes may, for example, define policy information. As an example, the attributes of a movie may include the movie's title, director, running time, year of release, rating (e.g., G, PG, PG-13, R, X, etc.), price, etc. The attributes associated with the data may (at least initially) be maintained separate from the data (e.g., as when a rating label is affixed to the outside of a VCR tape containing a movie) or may be placed in a data structure along with the content to be encrypted (e.g., when track, artist, title, and other attributes are placed in an MP3 data structure with the data for a song).

Some or all of the attributes and other suitable information governing the use of the data may be used as policy information. This policy information may be used by the data packaging service in constructing the public key Q for encrypting the data structure. An example of a suitable public key for a movie may be the movie's rating (e.g., rating=R). If desired, more policy-related attributes may be used to form the public key. As an example, a number of attributes for a digital video may be concatenated together to form the public key Q (e.g., attributes such as "securevideo://Name=Matrix; Distributor=Paramount;Date=Aug-2002;Rating="R." If desired, the data to be encrypted may be placed in a data structure such as an XML data structure. The policy data (attributes) that are used by the data packaging service 16 as the public key Q may be manually selected or may be automatically selected. If desired, data type encryption policy information may be used to define which attributes and policy information are used when forming Q. One set of attributes may be used for encrypting data of one type (e.g., when encrypting data in data structures of the type movie), whereas another set of attributes may be used for encrypting other types of data (e.g., when encrypting data in data structures of the type song). The data type encryption policy information may be provided in an XML format if desired.

The data may be encrypted at step 40 using the identity-based encryption engine at the data packaging service 16. The identity-based encryption engine implements the identity-based encryption algorithm and converts unencrypted information into encrypted information based on public parameter information and identity information (called the public key in the context of system 10 of FIG. 1). In particular, the identity-based encryption engine may use the identity-based encryption public key Q and the identity-based encryption public parameter information as first and second inputs to the identity-based encryption engine in addition to the data being encrypted.

The resulting encrypted data (and optionally the public key Q and other suitable policy data if desired) may be made available to users at step 42. For example, the encrypted data structures may be distributed to user equipment 22 via communications network 12 using distribution services 18. Storage media such as CDs and DVDs may also be used to distribute the encrypted data structures. Because the data is encrypted, peer-to-peer distribution processes may be used (e.g., one user 22 may email or otherwise transmit a received encrypted data structure or data item to another user 22 via communications network 12). Users 22 may download encrypted data (e.g., from a repository provided on a distribution service 18). Users may also receive the encrypted data when they originally receive the user device 22 (e.g., if the encrypted data is already stored on a hard drive in the user device 22 when the user receives the user device). Once the encrypted data has been made available to users at step 42, additional content may be obtained at step 38 (i.e., the process may continue), as indicated by line 44.

Figure 4:
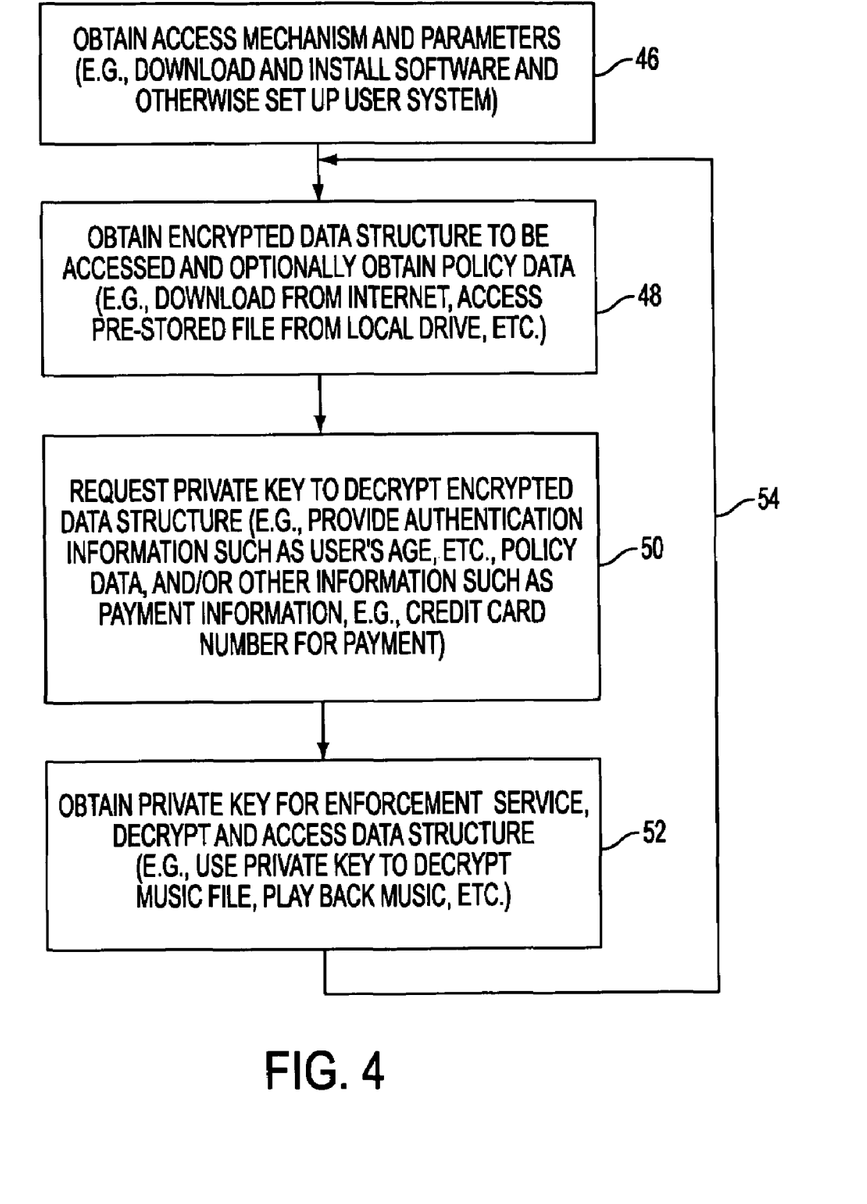
FIG. 4 is a flow chart of illustrative steps involved in allowing a user in the system of FIG. 1 to decrypt encrypted data in accordance with the present invention.

Illustrative steps involved in allowing a user to obtain access to the content (unencrypted version) of the encrypted data are shown in FIG. 4. The system may be set up at step 46. For example, the software that the user's equipment may use to perform access functions and associated parameters may be obtained at step 46. The necessary software may be preinstalled on the user's equipment, may be downloaded, or may be provided via a diskette, CD, or other storage media. The software may be a software package provided by a particular institution (e.g., a bank) or may be software provided by a distributor or manufacturer of general-purpose software (e.g., a provider of media player software). If the encrypted data is a digital movie file, for example, the software may be video software or media player software provided by a party associated with a digital subscription movie service. The video software may be used to handle the process of selecting a desired movie title from among various titles listed in a list provided by distribution server 18. The video software may be used to download the encrypted version of the movie. The video software may then be used by the user to handle the process of generating an access request (incorporating the appropriate public key), receiving the appropriate corresponding private key from the policy enforcement service, and decrypting and playing the movie for the user.

After the system has been set up at step 46, the user may obtain the encrypted data that is to be accessed. The user may, for example, obtain the encrypted data from the data packing service 16 via one or more of distribution services 18 or other suitable equipment. The encrypted data may also be prestored on the user's hard drive, in which case the process of obtaining the encrypted data may involve a local disk access function. Policy information (e.g., information such as included in the public key Q) may be provided to the user at the same time (or a different time) as the encrypted data or may be pre-stored on the user's equipment (e.g., in a table that the user accesses when it is time to provide the private key to the policy enforcement service). This may make the authentication and key generation process easier, because the user may simply forward the relevant policy information to the policy enforcement service 20 as part of the key request.

At step 50, the user may manually or automatically (using the appropriate user software such as the video playback software) generate a key request (i.e., the user may ask the policy enforcement service 20 to generate and provide the user with an appropriate private key to decrypt the encrypted data structure). The key request, which may include all of the public key/policy information except pre-stored global policy information (so-called because it may affect all users in system 10) or which may otherwise include appropriate information so that the policy enforcement service can determine which policy to apply and which private key to generate may be transmitted to the policy enforcement service 20 (e.g., over network 12). During the key request process, the policy enforcement service 20 uses the appropriate policy information for the data (i.e., the policy information associated with the data that the user has identified or has actually forwarded to the policy enforcement service and/or global or pre-stored policy information, etc.) to determine whether or not to grant the user access to the content. As an example, the policy information may contain information that specifies an allowable age range for users. The policy information may be, for example, a movie rating R, that dictates that only users of age 17 and greater may access the content of the associated encrypted data. As another example, all users with a certain subscription type (e.g., the "silver plan") may be granted access. These are merely illustrative policy types that may be used. Different and more complex policies may be used if desired. Moreover, the request process of step 50 may require that the policy enforcement service authenticate the identity of the user (or at least user characteristics such as age, etc.). Any suitable verification techniques may be used if desired. Moreover, the user may be asked to provide additional information during the user's interactions with the policy enforcement service. Such additional information may include, for example, payment information such as the user's credit card number, etc. (as required, e.g., by the policy information).

If the user provides appropriate information to the policy enforcement service 20 and if the policy enforcement service uses the policies set forth in the policy information and the user information to successfully verify that the user is authorized to access the encrypted data, the policy enforcement service 20 may issue a private key to the user and the user may obtain this key at step 52. The private key (sQ) corresponds to the public key Q that was used to encrypt the data and that was identified by or provided with the access request. Accordingly, the user may, at step 52, use the private key sQ to decrypt the encrypted data and to access and use the content of the data. In the illustrative situation of the encrypted movie, for example, the user may decrypt and play back the movie with the user's video software. The details of the key request process can be hidden from the user, so that the user need not ever know that a key is being requested by the user's software. As shown by line 54, the user may continue to obtain additional content by repeating the processes starting with step 48.

The data that is distributed using system 10 may, in general, be in any format. For example, digital movies may be stored as MPEG files, songs may be stored as MP3 files, etc. If desired, the data may be stored in data structures such as data structures using an XML format. (The data content may still be in an MPEG or MP3 file format.)

Particular formatting information may be used to determine which of the data attributes (e.g., a rating or some other attribute or a particular combination of attributes) are to be used in forming the public key Q that is subsequently used to encrypt the data. This so-called data type encryption policy information may be specific to the particular data type involved. For example, the data type encryption policy information may be used to dictate that all movies be encrypted using one set of policy information and that all songs be encrypted using another set of policy information. If desired, the data type encryption policy information may itself be provided in XML format. An illustrative scenario in which both the data and the data type encryption policy information are provided using XML is described above in connection with FIGS. 7a, 7b, and 7c.

Figure 5:
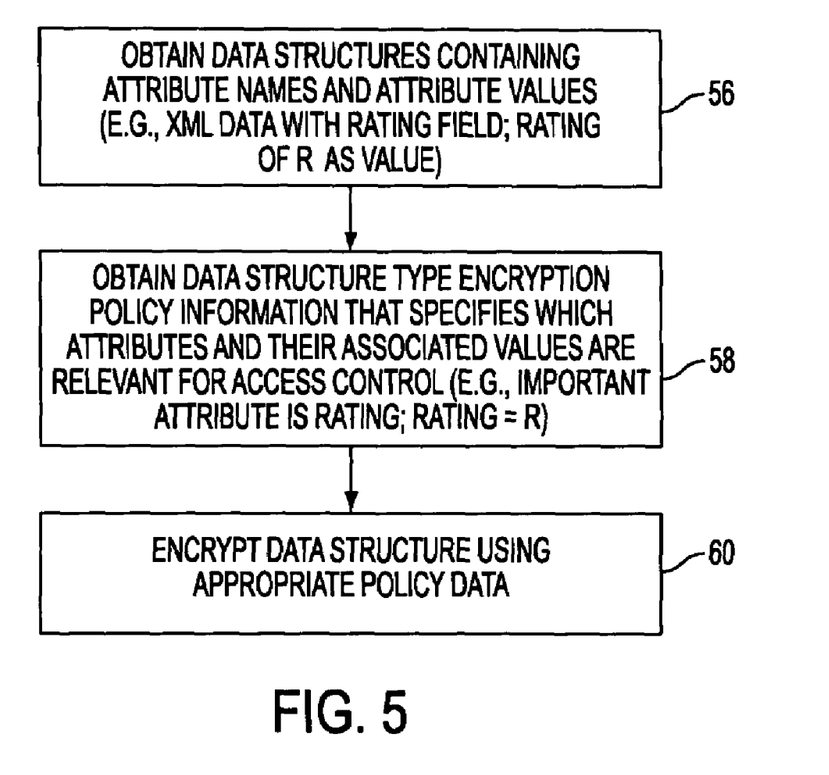
FIG. 5 is a diagram of illustrative steps involved in encrypting data structures in accordance with the present invention.

Illustrative steps involved in using XML data type encryption policy information to determine how to encrypt data are shown in FIG. 5. At step 56, the identity-based encryption engine at data packaging service 16 may obtain and/or create the data (e.g., data in data structures) to be encrypted. The data may contain content (e.g., a movie or song), may contain data type information (e.g., "movie" or "song"), and may contain or otherwise have other associated attributes (e.g., an attribute named "rating" with its corresponding attribute value of "R"—selected from possible values of G, PG, R, and X). Content is generally provided by content providers 14. Other information for the data (e.g., data type and other attribute information) may be provided by the data packager, the content provider, or other suitable entities or combinations of such entities.

At step 58, the data packaging service 16 may obtain data type encryption policy information. This information may be obtained from the content provider, may be created by personnel at the data packaging service 16, or may be created by any other suitable entity. The data structure type encryption policy information may, for example, specify that for the data type "movie," the attribute "rating" is the sole attribute to be used in forming the public key Q. As another example, the data type encryption policy information may specify that for the data type "song" the two attributes "artist" and "price" are to be concatenated together to form Q. These are merely illustrative examples of data type encryption policy information. Any suitable data type encryption policy information may be used if desired.

The data type encryption policy information may be provided and maintained in XML format or any other suitable form.

At step 60, the data packaging service 16 may use the data type encryption policy information and the attribute information associated with the data to form the public key Q. The data packaging service may then use the identity-based encryption engine to encrypt the data and its associated content. The identity-based encryption engine may use as inputs the public parameter information provided from the policy enforcement service 20 (P, sP) and the public key formed from the policy information (Q).

The foregoing is merely illustrative of the principles of this invention and various modifications can be made by those skilled in the art without departing from the scope and spirit of the invention.

What is claimed is:

1. A method for using identity-based encryption (IBE) to distribute data to users in a system that has a content provider, a data packaging service, a policy enforcement service, a plurality of users at respective user devices, and a communications network, comprising:

providing a data structure from the content provider to the data packaging service over the communications network, wherein the data structure includes data to be encrypted and data attributes for that data;

at the data packaging service, using at least some of the data attributes from the content provider as policy information to form an identity-based-encryption public key that is not specific to a single user, wherein the data packaging service uses data type encryption policy information to select which of the data attributes are used when forming the identity-based-encryption public key;

at the data packaging service, encrypting the data using an identity-based encryption engine, wherein the identity-based encryption engine uses the identity-based-encryption public key and identity-based-encryption public parameter information as inputs when encrypting the data;

making the encrypted data available to the plurality of users at the user devices;

at a given one of the users, generating a key request for an identity-based-encryption private key corresponding to the identity-based-encryption public key, wherein the key request includes the policy information;

receiving the key request from the given user at the policy enforcement service;

at the policy enforcement service, using the policy information from the key request to determine which access policy applies to the given user and to determine which identity-based-encryption private key to generate in response to the key request;

using the policy information from the key request and information on at least one characteristic of the given user at the policy enforcement service to determine whether the given user is authorized to receive the requested identity-based-encryption private key; and if the given user is authorized, using the policy enforcement service to transmit the requested identity-based-encryption private key to the user that corresponds to the identity-based-encryption public key.

2. The method defined in claim 1 further comprising using the private key and a decryption engine at the user device of the given user to decrypt the encrypted data so that the given user may access the content of the encrypted data.

3. The method defined in claim 1 wherein the policy information includes rating information, the method further comprising using the rating information in determining whether the given user is authorized to receive the requested private key.

4. The method defined in claim 1 wherein the policy information includes rating information selected from the group consisting of: a G rating, a PG rating, a PG-13 rating, an R rating, and an X rating.

5. The method defined in claim 1 wherein a media player is implemented on the user device of the given user, the method further comprising generating the key request using the media player.

6. The method defined in claim 1 further comprising using the identity-based encryption engine to automatically encrypt the data based on data type encryption policy information that is in an XML format.

7. The method defined in claim 6, wherein the data is in an XML format, the method further comprising using the identity-based encryption engine to automatically encrypt the XML-format data based on the XML-format data type encryption policy information.

8. The method defined in claim 1 wherein the public key comprises an XML-format public key and wherein using the policy information of the public key and information on at least one characteristic of the given user at the policy enforcement service to determine whether the given user is authorized to receive the requested identity-based-encryption private key further comprises using the XML-format public key in determining whether the given user is authorized to receive the private key corresponding to the public key.

9. The method defined in claim 1 wherein the data comprises a song, the method further comprising distributing the song to users using a peer-to-peer arrangement in which one user electronically transmits the song to another before the data is decrypted.

10. The method defined in claim 1 further comprising distributing the encrypted data from one user to another in a peer-to-peer arrangement before decrypting the encrypted data.

11. The method defined in claim 1 further comprising encrypting the data directly using an identity-based encryption algorithm without using symmetric key encryption to encrypt content in the data.

12. The method defined in claim 1 further comprising encrypting the data using a two-step process in which content in the data is encrypted using symmetric key and the symmetric key is encrypted using an identity-based encryption algorithm.

13. The method defined in claim 1 further comprising transmitting the public key from the data packaging service to the users over the communications network.

14. The method defined in claim 1 further comprising using global policy information at the policy enforcement service in determining whether the given user is authorized to receive the requested private key.

15. The method defined in claim 1 wherein the information on the characteristic of the given user includes information on the given user's age, the method further comprising using the policy information from the key request and the information on the user's age at the policy enforcement service to determine whether the given user is authorized to receive the private key corresponding to the public key.

* * * * *